United States Patent [19]  
Steffen et al.

[11] 4,147,236  
[45] Apr. 3, 1979

[54] PAD WEAR INDICATING ARRANGEMENT

[75] Inventors: Hermann Steffen, Neu-Isenburg; Rolf Weiler, Frankfurt-Sindlingen, both of Fed. Rep. of Germany

[73] Assignee: ITT Industries, Inc., New York, N.Y.

[21] Appl. No.: 875,261

[22] Filed: Feb. 3, 1978

[30] Foreign Application Priority Data

Feb. 16, 1977 [DE] Fed. Rep. of Germany ....... 2706481

[51] Int. Cl.² ............................................. F16D 66/02
[52] U.S. Cl. ................................. 188/1 A; 192/30 W; 200/61.44; 339/90 R; 339/190; 340/52 A
[58] Field of Search ...................... 188/1 A; 192/30 W; 340/52 A; 339/88 R, 88 C, 188 R, 188 C, 189 R, 189 L, 190, 90 R; 200/61.4, 61.42, 61.44

[56] References Cited  
U.S. PATENT DOCUMENTS

| 1,559,684 | 11/1925 | Douglas | 339/188 C X |
| 1,864,642 | 6/1932 | Douglas | 339/188 R X |
| 3,725,840 | 4/1973 | Hesse | 339/88 R X |

FOREIGN PATENT DOCUMENTS

| 247866 | 8/1960 | Australia | 188/1 A |
| 2610903 | 9/1977 | Fed. Rep. of Germany | 188/1 A |
| 1264573 | 2/1972 | United Kingdom | 188/1 A |

*Primary Examiner*—George E. A. Halvosa  
*Attorney, Agent, or Firm*—John T. O'Halloran; Alfred C. Hill

[57] ABSTRACT

The arrangement indicates pad wear for brake shoes comprising a contact head embedded in the brake shoe and a socket connector adapted to be readily connected with the contact head with an electrical line leading from the socket connector to an indicating arrangement. When the worn brake shoe is to be replaced only the contact head which is embedded in the brake shoe is discarded. The socket connector can be reused after each replacement.

27 Claims, 6 Drawing Figures

PAD WEAR INDICATING ARRANGEMENT

BACKGROUND OF THE INVENTION

This invention relates to a pad wear indicating arrangement including a contact head embedded in the backing plate of a brakeshoe assembly and substantially flush with the surface of the backing plate remote from the friction pad, with the contact head having an electrical conductor enveloped by an insulating layer and extending from the backing plate on the side of the pad, and including further a socket connector adapted to be connected with the contact head and providing a connection between the electrical conductor and an indicating arrangement.

From German Published Patent Application DOS 1,959,983, a pad wear indicating arrangement is known which includes a contact head embedded in the backing plate of a brake-shoe assembly so it does not extend from the surface of the backing plate remote from the friction pad. The contact head is designed as a coaxial plug and includes a stud coaxially arranged in a sleeve. Stud and sleeve, which are both designed as electrical conductors, extend from the backing plate on the side of the pad. In the area facing the pad, the space between the stud and the sleeve is occupied by an insulating material. The part of the contact head remote from the side of the pad and not occupied by insulating material forms, owing to the sleeve and the stud, a coaxial plug. This part of the contact head which is designed as a coaxial plug is adapted to connect with a suitably designed socket connector from which a line leads to an indicating arrangement, thereby providing a connection between the electrical conductors of the contact head and the indicating arrangement.

From Brisish Pat. No. 1,445,539 another pad wear warning device is known which includes a contact head adapted to be plugged into a fastening sleeve rigidly secured to the backing plate and projecting from the side of the backing plate opposite the side thereof on which the pad is mounted. By means of radial projections at the contact head which are adapted to engage in recesses at the fastening sleeve, the contact head is held in the fastening sleeve in the manner of a bayonet catch. The contact head consists of an insulating body having a conductive loop arranged therein, with the contact head incorporating the conductive loop projecting away from the backing plate on the side close to the pad a preset degree. Electric wires that are connected to the conductive loop and rigidly secured to the contact head lead to a warning device. When the friction pad of the brake-shoe assembly is worn away, the brake disc will contact that part of the contact head that extends from the backing plate on the side close to the pad, thereby abrading the insulating layer until it contacts the conductive loop, abrading also this loop. As a result, the electrical connection to the warning device is interrupted which will provide an indication of the pad wear. However, in view of the fact that the contact head forms one structural unit together with the fastening elements, the conductive loop and the rigidly secured electric wires, the whole expensive unit has to be thrown away at each replacement of the brake-shoe assembly. There is also the risk that following replacement of the brake-shoe assembly, the replacement of the pad wear warning device is forgotten.

It is a further disadvantage in this pad wear warning device that the fastening sleeve projects a large distance away from the rear surface of the backing plate which presents an obstacle to a simple method of packaging and storing the brake-shoe assemblies since they do not allow stacking.

SUMMARY OF THE INVENTION

It is the object of the present invention to provide a pad wear indicating arrangement which allows straightforward assembly and functions safely under all operating conditions.

A feature of the present invention is the provision of a pad wear indicating arrangement including a contact lead embedded in the backing plate of a brake-shoe assembly and not projecting from the surface of the backing plate remote from the friction pad, the contact head having an electrical conductor enveloped by an insulating layer and extending from the backing plate on the side of the pad, and including further a socket connector adapted to be connected with the contact head and providing a connection between the electrical conductor and an indicating device, said pad wear indicating arrangement further comprising the socket connector adapted to be in positive engagement with the contact head; a contact element disposed to be axially slidable in the socket connector normal to the plane of the backing plate, the contact element having an end surface extending from the socket connector and facing the contact head; and a resilient means preloading the contact element end against a contact surface of the electrical conductor, the preload of the resilient means being increased as the socket connector becomes positively engaged with the contact head.

Owing to the above-mentioned positive engagement, a safe connection between the socket connector and the contact head is ensured which cannot be disengaged as a result of high temperatures occurring at the brake, vibrations during operation or pebbles hitting against the socket connector. Another safety factor preventing disengagement is the clamping effect of the socket connector relative to the contact head which is achieved by the resilient means.

In an advantageous embodiment, the contact element is piston-shaped and guided in a bore in the socket connector, with a particularly advantageous embodiment being that the contact element is designed as a stepped piston which is guided in a stepped bore of the socket connector. This arrangement has the advantage that the steps of the piston and the bore may be used as supporting surfaces for the resilient means or as stops to limit the travel of displacement of the contact element.

Advantageous use of the steps of the stepped piston and the stepped bore is made by the contact element resting with the end surface of its large step against the electrical conductor of the contact head and by arranging a pressure spring in the stepped bore which rests against the large step of the contact element and takes support on the bottom of the large step of the stepped bore.

To achieve a safe contact between the contact element and the electrical conductor of the contact head, the end of the contact element facing the contact head may be pointed, with the pointed end resting against the electrical conductor of the contact head. This results in a high surface pressure between the pointed end of the contact element and the electrical conductor which prevents the formation of a corrosive layer between these two parts which could act as an insulation. Further, the positive engagement is ensured by the preload of the resilient means preventing involuntary disengagement. In this arrangement, it will be an advantage if the end of the contact element facing the contact head is a taper.

In order to prevent the contact element from falling out of the socket connector when it is disengaged from the contact head, the travel of displacement may be limited by a stop. In an advantageous embodiment of the stop, the end of the small step of the stepped psiton on the side remote from the contact head projects out of the bore where it has an extension of a diameter larger than the bore. In this arrangement, the extension may be a circlip inserted in a radial circumferential groove located at the end of the contact element projecting out of the stepped bore.

By arranging the electrical line leading to the indicating arrangement at the end of the contact element remote from the contact head, a simple structure as well as a simple possibility to assemble the contact head can be achieved.

To avoid that the high temperatures occurring at the brake and the brake-shoe assembly during braking are transferred to the various parts of the socket connector, the socket connector includes preferably a heat-proof body of electrically non-conductive material in which the contact element is axially slidable. It will be a particular advantage in this arrangement if the body consists of a cylindrical and a cup-shaped member, with the cylindrical member accommodating the contact element and being inserted into and secured to the opening of the cup-shaped member.

In a particularly advantageous embodiment of the present invention whereby the socket connector is adapted to be in positive engagement with the contact head, the confronting surfaces of the contact head and the socket connector are designed as a bayonet plug-and-socket connection. This bayonet connection may be so designed, for example, that the socket connector, on its side facing the contact head, includes radially outwardly directed shoulders while the contact head, on its side facing the socket connector, includes radially inwardly directed shoulders, with each shoulder of the socket connector being assigned a shoulder of the contact head and the co-operating shoulders mutually overlapping one another in the assembled state of the socket connector. In this arrangement, it will be an advantage to use as the shoulders of the socket connector parts of the end of a sleeve bent outwardly in the manner of a flange, with the sleeve being secured to the body of the socket connector.

To prevent the transfer of heat from the brake-shoe assembly to the contact element and the resilient means via the sleeve, the sleeve is advantageously disposed between the cylindrical member and the cup-shaped member, thereby enclosing the cylindrical member. In this arrangement, the sleeve may be in positive engagement with both the cylindrical member and the cup-shaped member of the body which has the advantage of preventing disengagement of these members due to the influence of temperature.

The shoulders of the contact head may likewise be formed by parts of the end of a sleeve bent inwardly in the manner of a flange, with the sleeve being secured to the body of the contact head. In this arrangement, the sleeve is advantageously at the same time the housing of the contact head.

In order to protect the electrical conductor of the contact head against the influence of high temperatures and avoid at the same time faulty contact being made as a result of pad abrasion, the contact head includes advantageously a body of heat-proof electrically non-conductive material which is in positive engagement with the sleeve and accommodates the electrical conductor. As a result of the positive engagement, the body is not allowed to disengage from the sleeve. This type of contact head may be an inexpensive throwaway component rigidly secured to the brake-shoe assembly and may be disposed of together with the worn brake-shoe assembly.

Because of its simplicity in construction, the contact head may also be fitted to the brake-shoe assembly retroactively.

Moreover, by virtue of the fact that the contact head does not extend from the side of the backing plate remote from the friction pad, simple packaging and storing is afforded since the brake shoes allow stacking without there being obstructions by projecting parts.

A simple and safe assembly of the socket connector with the contact head is achieved by providing, in the assembled state of the socket connector, for abutment of a shoulder of the socket connector and the contact head against a stop of the contact head and the socket connector, respectively, said stop limiting a rotary motion of the socket connector about its longitudinal axis. This arrangement permits during assembly the contact head to be safely installed in its proper mounting position. In another possibility to fix the contact head in its proper mounting position, a shoulder of the socket connector and the contact head, respectively, is locked, in the assembled state of the socket connector, between two notches limiting a rotary motion of the socket connector about its longitudinal axis. It is achieved by these two notches that the socket connector is not allowed to rotate automatically and disengage from its mounting position.

To avoid the need to care whether the brake disc is properly connected to ground, the electrical conductor in the contact head may be a wire loop, each end of the wire loop being adapted to connect with a contact element disposed in the socket connector. In this arrangement, the wire loop may advantageously include one or several fuses.

In the embodiment incorporating a fuse, a voltage is applied to the wire loop so that a short circuit will occur when the contact element contacts the brake disc, thereby permanently destroying the fuse.

In the embodiment without a fuse, the wire loop is part of a closed circuit in which an indicator lamp may be inserted, with the closed circuit being interrupted by the brake disc abrading away the wire loop.

To provide protection against the entry of moisture and dirt and thus also against faulty contact being made, the socket connector includes advantageously a cup-shaped casing of elastic material whose opening facing the contact head has an edge which is designed as a radial circumferential and elastically deformable lip bearing biassed against the backing plate in the assembled state of the socket connector. Owing to the fact that the lip rests biassed against the backing plate, the confronting surfaces of the socket connector and the contact head are tightly sealed towards the outside so that external influences cannot adversely affect the pad wear indicating arrangement.

To be able to secure the cup-shaped casing to the socket connector in a simple and safe manner, the casing has advantageously at its opening a radially inwardly directed bead embracing the edge of the cup-shaped member of the socket connector facing the contact head.

To provide protection against damage of the bead being caused by high temperatures at the backing plate, the bead may include, on its side close to the backing plate, a circumferential groove accommodating a ring made of temperature-resistant material and extending out of the groove, so that the bead of the cup-shaped casing is not in direct abutment with the backing plate, but uses the ring of temperature-resistant material as an intermediary.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
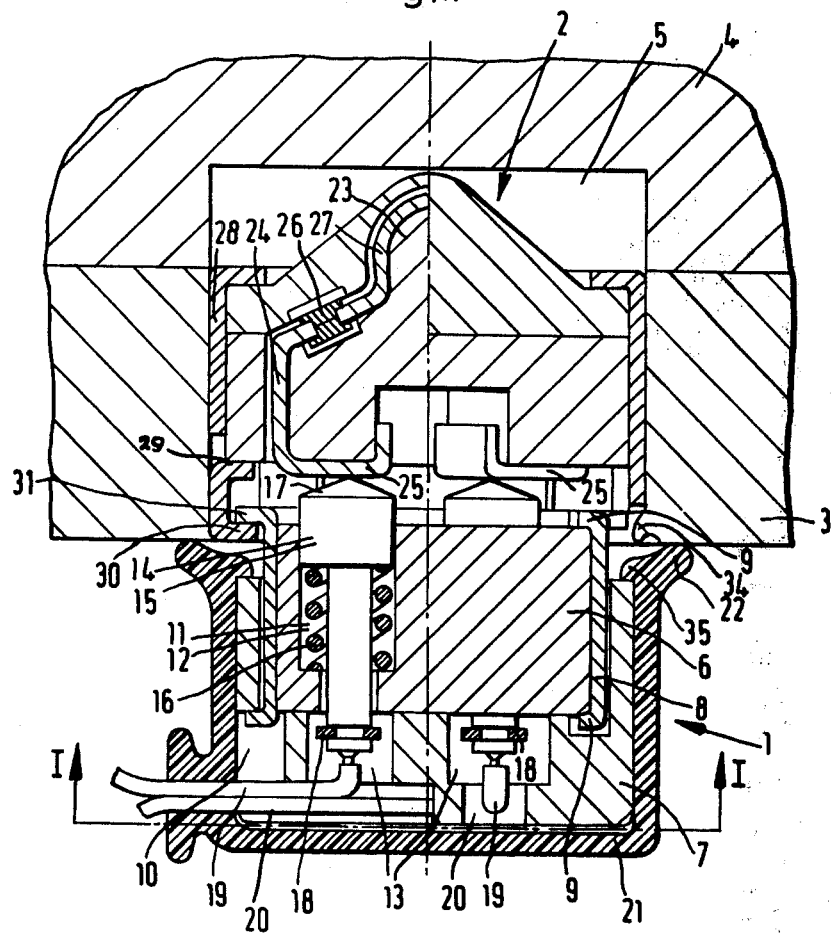
FIG. 1 is a sectional view of a pad wear indicating arrangement in accordance with the principles of the present invention, taken along the lines II—II of FIG. 3 and III—III of FIG. 5.
Figure 2:
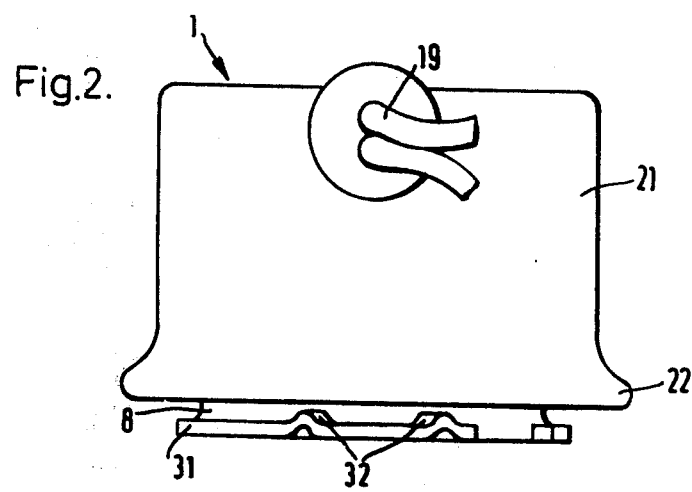
FIG. 2 is a side view of the socket connector of FIG. 1 in accordance with the principles of the present invention.
Figure 3:
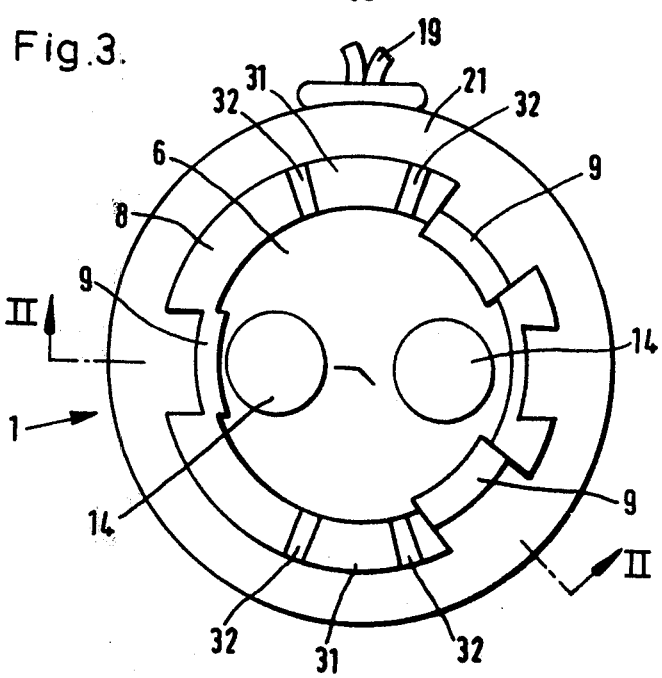
FIG. 3 shows the socket connector of FIG. 2 viewed facing the contact head.
Figure 4:
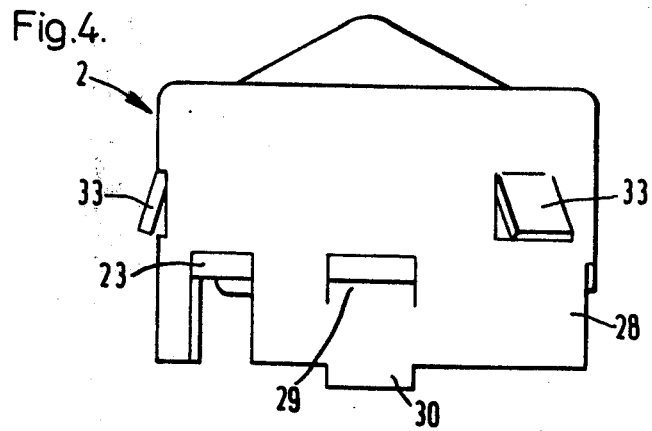
FIG. 4 shows the contact head of FIG. 1 according to the principles of the present invention.
Figure 5:
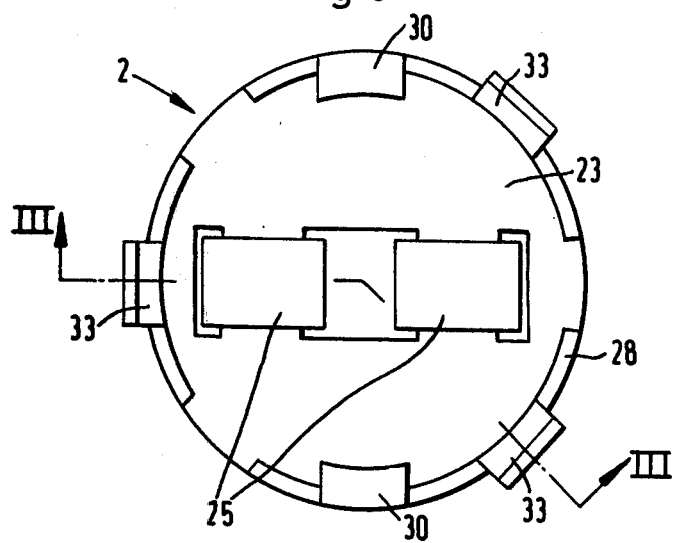
FIG. 5 shows the contact head of FIG. 4 viewed facing the socket connector.
Figure 6:
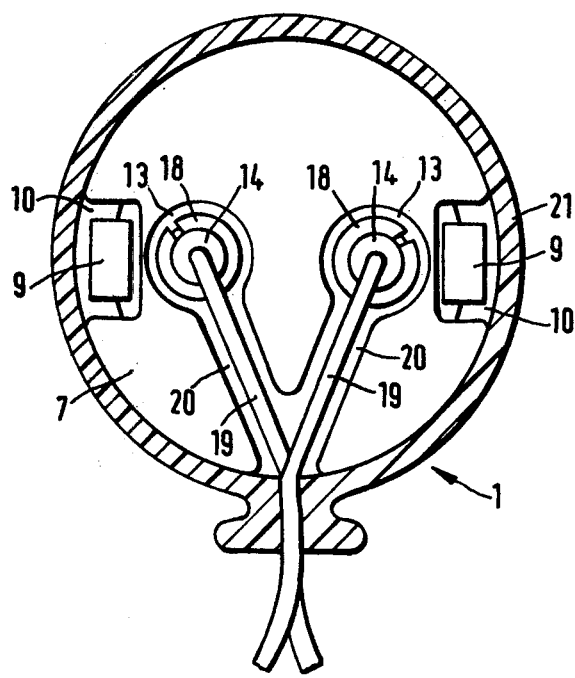
FIG. 6 is a sectional view of the socket connector of FIG. 1 taken along the line I—I.

The pad wear indicating arrangement illustrated in FIG. 1 consists of a socket connector 1 which is in positive engagement with a contact head 2. The contact head is rigidly secured in a bore of the backing plate 3 of a brake-shoe assembly, extending, on the side close to the brake-pad, into a recess 5 formed in the friction pad 4. Socket connector 1 and contact head 2 are also illustrated separately in FIGS. 2 to 6.

The socket connector consists of a body comprising two parts and made of heat-proof, heat-insulating, electrically non-conductive material. The one part of the body is a cylindrical member 6 which is inserted into the opening of a cup-shaped member 7. Disposed between the cylindrical member 6 and the cup-shaped member 7 is a sleeve 8 embracing the cylindrical member 6 and having at its ends tab-like shoulders 9 embracing the ends of the cylindrical member 6 and, respectively, engage in recesses 10 of the cup-shaped member 7, thereby providing for positive engagement between the cylindrical member 6 and the cup-shaped member 7.

In the cylindrical member 6 stepped bores 11 are formed whose longitudinal axis is at right angles to the plane of the backing plate 3. The large step 12 of the stepped bores is directed towards the backing plate 3 whereas the smaller-diameter portion of the stepped bores 11 terminates into a chamber 13 formed in the bottom of the cup-shaped member 7. Axially slidable in the stepped bore 11 is a contact element 14 which is designed as a stepped piston, with a pressure spring 16 being disposed between the bottom of the stepped bore and the large step 15 of the contact element 14, said spring encircling the small step of the contact element 14. With part of its large step 15, the contact element 14 projects out of the stepped bore 11, said projecting end being formed as a taper 17. At the end of contact element 14 projecting into chamber 13, a radial circumferential groove accommodates a circlip 18 whose diameter is larger than the diameter of the small step of the stepped bore 11, thereby limiting the travel of displacement of the contact element 14. Rigidly secured to the front surface of the end of the contact element 14 projecting into chamber 13 is an electrical line 19 which leads out of the socket connector 1 through a conduit 20 formed in the bottom of the cup-shaped member 7 to communicate with an indicating arrangement (not shown).

The whole socket connector 1 is enveloped by a cup-shaped casing 21 of elastic material the opening of which is directed towards the backing plate 3 and includes, at its edge, a radial circumferential, elastically deformable lip 22 resting under bias and closely against the backing plate 3 in the assembled state of the socket connector 1. At this edge, there is disposed further a radially inwardly directed radial circumferential bead 35 embracing the edge of the cup-shaped member 7 of the socket connector 1 facing the contact head 2, thereby keeping the casing 21 firmly against the socket connector 1. The contact head 2 includes a body 23 of heat-proof, heat-insulating and electrically nonconductive material in which an electrical conductor 24 which is formed as a wire loop is disposed. The two ends of the wire loop extend out of the side of the contact head 2 facing the socket connector 1 and run in the area of the contact elements 14 of the socket connector 1 in the plane of the backing plate 3, thus forming contact surfaces 25 facing the socket connector against which, in the assembled state of the socket connector, the tapers 17 of the contact elements 14 are biassed by the preloaded pressure springs 16. By virtue of the tapers 17 of the contact elements 14, a high surface pressure is achieved between the contact elements 14 and the contact surfaces 25, thereby ensuring safe contact between these two parts which cannot be interrupted by corrosion. Further, the electrical conductor 24 includes fuses 26 which will fuse and thus interrupt the flow of current through the wire loop when there is contact between the brake disc and the portion 27 of the electrical conductor 24 disposed between the two fuses 26 and extending into the recess 5 in the friction pad 4.

The contact head 2 includes a housing formed by a sleeve 28 which with its end close to the friction pad 4 embraces the body 23 and has radially inwardly extending shoulders 29. The body 23 abuts against shoulder 29 with its front end facing the socket connector 1 and thereby is in positive engagement with the sleeve 28.

Both the sleeve 28 of the contact head 2 and the sleeve 8 of the socket connector 1 include, at their confronting ends, radially inwardly and, respectively, outwardly directed shoulders 30 and 31, respectively, each shoulder 31 of the socket connector 1 being assigned a shoulder 30 of the contact head 2, and the co-operating shoulders 30 and 31 mutually overlapping one another in the assembled state of the socket connector 1, thereby forming a bayonet plug-and-socket connection. At the shoulders 31 of the socket connector 1, there are provided, for each shoulder 30 of the contact head 2, a pair of notches 32 for locking engagement of the shoulders 30 of the contact head 2 in the assembled state of the socket connector 1.

To prevent the contact head 2 from being disengaged from its bore in the backing plate 3, the casing of the sleeve 28 includes, spaced over its circumference, several tabs 33 with one end thereof bent radially outwardly, said tabs resting biassed against the wall of the bore in the backing plate in the assembled state of the contact head 2. Moreover, to avoid disengagement of the contact head 2 from the bore in the backing plate 3, the bore is radially inwardly wedged at various locations 34 in its area close to the socket connector 1, thereby providing for positive engagement of the contact head 2 with the backing plate 3.

Owing to the fact that the contact elements 14 rest biassed against the contact surfaces 25 and that, in addition, the lip 22 of the casing 21 is likewise biassed against the backing plate 3, the socket connector 1 and the contact head 2 are tightly braced at their shoulders 30 and 31, respectively, and unable to disengage automatically. A rotary movement of the socket connector 1 which would cause the shoulders 30 and 31 to become disengaged is prevented by the notches 32. The casing 21 which completely envelops the contact head and rests with its lip 22 tightly against the backing plate 3 prevents the entry of dirt and moisture into the contact area between the socket connector 1 and the contact head 2 so that accidental contact caused by external influences cannot be made. The positive-engagement connections of the individual parts of the socket connector 1 and the contact head 2 eliminate the possibility of disengagement of these parts as a result of high temperatures developing during braking. This is of particular importance for heavy vehicles, such as buses and trucks, since it is precisely on such vehicles that high temperatures develop during braking operations. The heat thereby generated is kept away from the casing 21 of elastic material largely owing to the structure of the contact head 2 which is a heat-proof material of low thermal conductivity, so that it cannot be damaged as a result of high temperatures.

Moreover, the bayonet plug-and-socket connection between the socket connector 1 and the contact head 2 permits simple and straightforward assembly, the solid bottom of the cup-shaped member 7 preventing damage to the electrical lines 19 connected with the contact elements 14.

While we have described above the principles of our invention in connection with specific apparatus it is to be clearly understood that this description is made only by way of example and not as a limitation to the scope of our invention as set forth in the objects thereof and in the accompanying claims.

We claim:
1. A pad wear indicating arrangement comprising:
    a contact head embedded in a backing plate of a brake-shoe assembly and not projecting from the surface of said backing plate remote from a friction pad of said brake-shoe assembly, said contact head having an electrical conductor enveloped by an insulating layer and extending from said backing plate on the side of said pad;
    a socket connector adapted to positively engage said contact head and provide a connection between said electrical conductor and an indicating device;
    a contact element disposed to be axially slidable in said socket connector normal to the plane of said backing plate, said contact element having an end surface extending from said socket connector into said backing plate and facing said contact head; and
    a resilient means preloading said end surface of said contact element against a contact surface of said electrical conductor, said preload of said resilient means being increased as said socket connector becomes positively engaged with said contact head.

2. A pad wear indicating arrangement according to claim 1, wherein
    said contact element is piston-shaped and guided in a bore of said socket connector.

3. A pad wear indicating arrangement according to claim 1, wherein
    said contact element is a stepped piston and guided in a stepped bore of said socket connector.

4. A pad wear indicating arrangement according to claim 3, wherein
    said resilient means includes
    a pressure spring.

5. A pad wear indicating arrangement according to claim 4, wherein
    said end surface is a portion of a large step of said contact element and bears against said electrical conductor, and
    said pressure spring is disposed in said stepped bore bearing against said large step of said contact element and bearing against a large step of said stepped bore.

6. A pad wear indicating arrangement according to claim 5, wherein
    said end surface of said contact element facing said contact head has a pointed end which bears against said electrical conductor.

7. A pad wear indicating arrangement according to claim 5, wherein
    said end surface of said contact element facing said contact head is tapered.

8. A pad wear indicating arrangement according to claim 5, wherein
    the displacement of said contact element is limited by a stop.

9. A pad wear indicating arrangement according to claim 8, wherein
    the smaller diameter portion of said stepped piston remote from said contact head projects out of the smaller diameter portion of said stepped bore, and
    means secured to said smaller diameter portion of said stepped piston outside said stepped bore to provide said smaller diameter portion of said stepped piston with a diameter greater than said smaller diameter portion of said stepped bore to provide said stop.

10. A pad wear indicating arrangement according to claim 9, wherein
    said means includes
    a circlip inserted into a circumferential groove disposed in said smaller diameter portion of said stepped piston outside said stepped bore.

11. A pad wear indicating arrangement according to claim 1, further including
    an electrical line leading to said indicating device is connected to an end of said contact element remote from said contact head.

12. A pad wear indicating arrangement according to claim 1, wherein
    said socket connector includes
    a heat-proof body of electrically nonconductive material in which said contact element is axially slidable.

13. A pad wear indicating arrangement according to claim 12, wherein
said body includes
a cup-shaped member, and
a cylindrical member in which said contact element is axially slidable, said cylindrical member being disposed within and secured to an opening of said cup-shaped member.

14. A pad wear indicating arrangement according to claim 13, wherein
the confronting surfaces of said contact head and said socket connector form a bayonet plug-and-socket connection.

15. A pad wear indicating arrangement according to claim 14, wherein
said socket connector adjacent said contact head includes radially outwardly directed shoulder, and
said contact head adjacent said socket connector includes radially inwardly directed shoulders,
each of said shoulders of said socket connector being in a cooperative mutually overlapping relationship with a different one of said shoulders of said contact head in the assembled state of said socket connector and said contact head.

16. A pad wear indicating arrangement according to claim 15, wherein
said shoulders of said socket connector are formed by parts of the end of a first sleeve bent outwardly in the manner of a first flange, said first sleeve being secured to said body of said socket connector.

17. A pad wear indicating arrangement according to claim 16, wherein
said first sleeve is disposed between said cylindrical member and said cup-shaped member to enclose said cylindrical member.

18. A pad wear indicating arrangement according to claim 17, wherein
said first sleeve is in positive engagement with said cylindrical member and said cup-shaped member.

19. A pad wear indicating arrangement according to claim 18, wherein
said shoulders of said contact head are formed by parts of the end of a second sleeve bent inwardly in the manner of a second flange, said second sleeve being secured to a body of said contact head.

20. A pad wear indicating arrangement according to claim 19, wherein
said second sleeve is a housing of said contact head.

21. A pad wear indicating arrangement according to claim 20, wherein
said contact head includes
a body of heat-proof, electrically nonconducting material which is in positive engagement with said second sleeve, said body containing said electrical conductor.

22. A pad wear indicating arrangement according to claim 21, wherein
said shoulders of said socket connector and said shoulders of said contact head, in the assembled state of said socket connector and said contact head, abuts against a stop of said contact head and said socket connector, said stop limiting a rotary motion of said socket connector about its longitudinal axis.

23. A pad wear indicating arrangement according to claim 21, wherein
said shoulders of said socket connector and said shoulders of said contact head are locked, in the assembled state of said socket connector and said contact head, between two notches limiting a rotary motion of said socket connector about its longitudinal axis.

24. A pad wear indicating arrangement according to claim 1, wherein
said electrical conductor is a wire loop, each end of said wire loop being connected with a different one of two of said contact elements disposed in said socket connector.

25. A pad wear indicating arrangement according to claim 24, wherein
said wire loop includes
at least one fuse.

26. A pad wear indicating arrangement according to claim 1, wherein
said socket connector includes
a cup-shaped casing of elastic material whose opening adjacent said contact head has an edge which is a radially circumferential and elastically deformable lip in a biassed bearing relation against said backing plate in the assembled state of said socket connector.

27. A pad wear indicating arrangement according to claim 26, wherein
said casing further includes
a radially inwardly directed bead adjacent said lip embracing an edge of a cup-shaped member of said socket connector adjacent said contact head.

* * * * *